(12) United States Patent
Hsieh et al.

(10) Patent No.: US 10,712,956 B2
(45) Date of Patent: Jul. 14, 2020

(54) MANAGEMENT METHOD AND STORAGE SYSTEM USING THE SAME

(71) Applicant: Wiwynn Corporation, New Taipei (TW)

(72) Inventors: Cheng-Kuang Hsieh, New Taipei (TW); Chung-Fu Huang, New Taipei (TW)

(73) Assignee: Wiwynn Corporation, New Taipei (TW)

(*) Notice: Subject to any disclaimer, the term of this patent is extended or adjusted under 35 U.S.C. 154(b) by 155 days.

(21) Appl. No.: 16/027,278

(22) Filed: Jul. 4, 2018

(65) Prior Publication Data

US 2019/0294349 A1 Sep. 26, 2019

(30) Foreign Application Priority Data

Mar. 20, 2018 (TW) .............................. 107109376 A

(51) Int. Cl.
*G06F 3/06* (2006.01)

(52) U.S. Cl.
CPC ............ *G06F 3/0629* (2013.01); *G06F 3/061* (2013.01); *G06F 3/0607* (2013.01); *G06F 3/0689* (2013.01)

(58) Field of Classification Search
CPC .......... G06F 3/06; G06F 3/061; G06F 3/0607; G06F 3/0629; G06F 3/0689; G06F 12/00; G06F 13/00

USPC .......................... 711/100, 114, 115, 154, 200
See application file for complete search history.

(56) References Cited

U.S. PATENT DOCUMENTS

| | | |
|---|---|---|
| 6,275,898 B1 | 8/2001 | DeKoning |
| 6,496,914 B1 | 12/2002 | Vook |
| 6,526,478 B1 | 2/2003 | Kirby |
| 8,239,584 B1 | 8/2012 | Rabe |
| 8,443,153 B1 | 5/2013 | Edwards |
| 9,619,169 B1* | 4/2017 | Throop .................... G06F 3/061 |
| 2006/0179218 A1 | 8/2006 | Burkey |
| 2011/0264843 A1* | 10/2011 | Haines .................. G06F 3/0629 711/103 |
| 2014/0013032 A1* | 1/2014 | Min ..................... G06F 12/0246 711/103 |
| 2017/0160959 A1* | 6/2017 | Wang .................... G06F 3/0619 |

* cited by examiner

*Primary Examiner* — Tuan V Thai
(74) *Attorney, Agent, or Firm* — Winston Hsu

(57) ABSTRACT

A management method for a storage system is disclosed. The storage system comprises a plurality of hard disks, the management method comprises dividing the plurality of hard disks into a hot storage group, a warm storage group and a cold storage group according to a first threshold and a second threshold; exchanging a first warm storage hard disk conforming to the first threshold in the warm storage group with a hot storage hard disk in the hot storage group in response to not conform to the first threshold; and exchanging a cold storage hard disk conforming to the second threshold in the cold storage group with a second warm storage hard disk in the warm storage group in response to conform to the second threshold.

8 Claims, 4 Drawing Sheets

MANAGEMENT METHOD AND STORAGE SYSTEM USING THE SAME

BACKGROUND OF THE INVENTION

1. Field of the Invention

The present invention relates to a management method and storage system using the same, and more particularly, to a management method and storage system capable of allocating and processing different data according to the efficiency of hard disk.

2. Description of the Prior Art

With the advancement and development of technology, storage capacities of conventional hard disk drives (HDDs) are increased. In a conventional storage system, the efficiency of HDD, HDD controller and HDD server deteriorates with factors of wind flow, vibration or the hard disk itself; especially when the storage capacity of the hard disk is increased, the hard disk is more sensitive to variation factors of surrounded environment, and slight abnormal event might affect the efficiency of the hard disk. Under the conventional structure of the hard disk, one or more hard disks may correspond to a redundant array of independent disks (RAID) and the RAID may correspond to a logic unit number (LUN) according to a capacity requirement, and then the LUN is mapped to a host. Under the structure, the RAID and LUN may correspondingly represent the efficiency of the hard disk or a hard disk group, e.g. a single hard disk or multiple hard disks. However, the RAID and LUN may merely represent the efficiency of the corresponding hard disk group. As a result, changing all of the hard disks is allowable only when all of the hard disks are damaged and malfunctioned, which affects the storage performance of the entire storage system. Therefore, an improvement is necessary for the conventional technique.

SUMMARY OF THE INVENTION

The present invention discloses a management method for a storage system, wherein the storage system comprises a plurality of hard disks. The management method comprises dividing the plurality of hard disks into a hot storage group, a warm storage group and a cold storage group according to a first threshold and a second threshold; exchanging a first warm storage hard disk conforming to the first threshold in the warm storage group with a hot storage hard disk in the hot storage group in response to not conform to the first threshold; and exchanging a cold storage hard disk conforming to the second threshold in the cold storage group with a second warm storage hard disk in the warm storage group in response to not conform to the second threshold.

The present invention further discloses a storage system, comprising a host comprising a plurality of hard disks; and a controller coupled to the host, for executing a management process, wherein the management process comprises dividing the plurality of hard disks into a hot storage group, a warm storage group and a cold storage group according to a first threshold and a second threshold; exchanging a first warm storage hard disk conforming to the first threshold in the warm storage group with a hot storage hard disk in the hot storage group in response to not conform to the first threshold; and exchanging a cold storage hard disk conforming to the second threshold in the cold storage group with a second warm storage hard disk in the warm storage group in response to not conform to the second threshold.

The present invention further discloses a storage system, comprising a host comprising a plurality of hard disks; and a controller coupled to the host, for executing a management process, wherein the management process comprises dividing the plurality of hard disks into a first group and a spare group according to a predetermined condition; substituting a first spare hard disk in the spare group for a first hard disk in the first group in response to not conform to the predetermined condition; and indicating to change the storage system when an amount of hard disk included in the spare group is zero.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
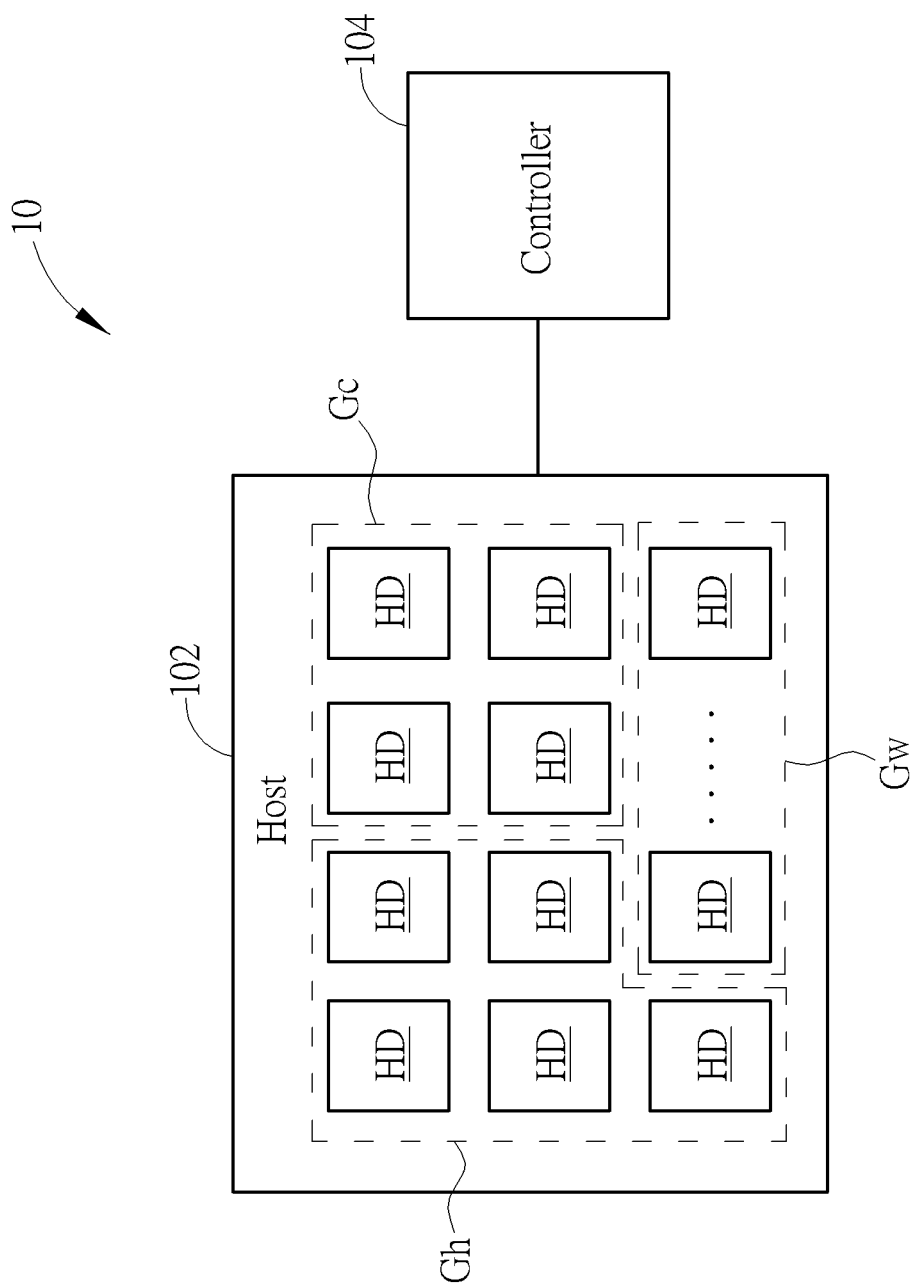
FIG. 1 is a schematic diagram of a storage system according to an embodiment of the present disclosure.

Please refer to FIG. 1, which is a schematic diagram of a storage system 10 according to an embodiment of the present disclosure. The storage system 10 includes a host 102 and a controller 104. The host 102 is configured to include a plurality of hard disks HD. The controller 104 is coupled to the host 102, for executing a management method of the hard disks HD according to the performance of the hard disks HD. The hard disks HD included in the host 102 may be implemented by a conventional hard disk drive (HDD), a solid state disk (SSD) or a solid state hybrid drive (SSHD), for storing data. In an embodiment, as shown in FIG. 1, the controller 104 divides the hard disks HD into a hot storage group Gh, a warm storage group Gw and a cold storage group Gc according to a first threshold and a second threshold, so as to exchange a warm storage hard disk conforming to the first threshold in the warm storage group Gw with a hot storage hard disk in the hot storage group Gh when performance of any hot storage hard disk in the hot storage group Gh does not conform to the first threshold, and to exchange a cold storage hard disk conforming to the second threshold in the cold storage group Gc with the warm storage hard disk in the warm storage group Gw when any cold storage hard disk in the cold storage group Gc is conforming to the second threshold, and the warm storage hard disk does not conform to the second threshold. That is, the storage system 10 divides all of the hard disks into three groups according to the first threshold and the second threshold, and when the hard disks in the groups do not conform to the first threshold or the second threshold, the steps for exchanging the hard disks are executed. Notably, an amount of the hard disks included in the hot storage group Gh, the warm storage group Gw and the cold storage group Gc depicted in FIG. 1 is merely an example, but not limited thereto; modifications may be made according to system requirements. Therefore, the storage system 10 of the present disclosure may consistently detect a storage performance of all of the hard disks in the host 102, so as to properly allocate the hard disks with different data and to maximize the performance of the storage system 10.

Notably, those skilled in the art may make combinations, modifications or variations to the above embodiments according to the spirit of the present disclosure, and not limited thereto. The flowcharts stated above may be implemented by devices, which may be hardware, firmware (a combination of hardware device, with computer commands and data, wherein the computer commands and data belong to a read-only software on the hardware device) or computer systems. The hardware may be an analog microcomputer circuit, a digital microcomputer circuit, a hybrid microcomputer circuit, a microcomputer chip or wafer. The computer systems may be a system on chip (SOC), a system in package (SiP), a computer on module (COM) or the storage system 10.

The embodiment stated above briefly illustrates that the storage system of the present disclosure properly adjusts the hard disks HD to store different data according to the storage performance of the hard disks, so as to maximize the performance of the storage system. Notably, those skilled in the art may properly design the storage system according to different system requirements, and not limited thereto, and all belong to the scope of the present disclosure.

Figure 2:
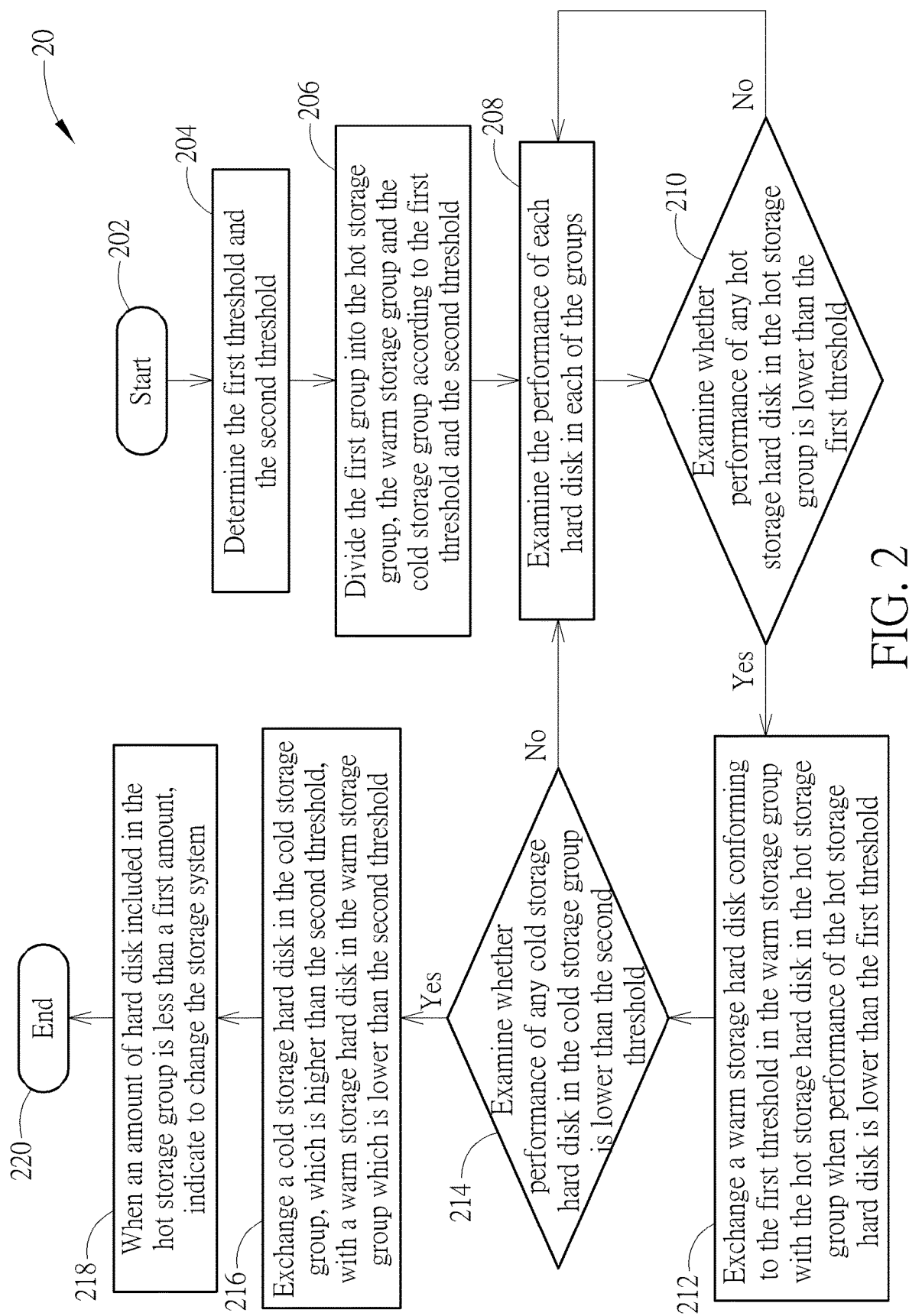
FIG. 2 is a schematic diagram of a management process according to an embodiment of the present disclosure.

Please continue to refer to FIG. 2, which is a schematic diagram of a management process 20 according to an embodiment of the present disclosure. The management process 20 may be compiled as a program code and be applied on the storage system 10. The management process 20 includes the following steps:

Step 202: Start.

Step 204: Determine the first threshold and the second threshold.

Step 206: Divide the first group into the hot storage group Gh, the warm storage group Gw and the cold storage group Gc according to the first threshold and the second threshold.

Step 208: Examine the performance of each hard disk in each of the groups.

Step 210: Examine whether performance of any hot storage hard disk in the hot storage group Gh is lower than the first threshold. If yes, execute step 212; if not, execute step 208.

Step 212: Exchange a warm storage hard disk conforming to the first threshold in the warm storage group Gw with the hot storage hard disk in the hot storage group Gh when performance of the hot storage hard disk is lower than the first threshold.

Step 214: Examine whether performance of any cold storage hard disk in the cold storage group Gc is lower than the second threshold. If yes, execute step 216; if not, execute step 208.

Step 216: Exchange a cold storage hard disk in the cold storage group Gc, which is higher than the second threshold, with a warm storage hard disk in the warm storage group Gw which is lower than the second threshold.

Step 218: When an amount of hard disk included in the hot storage group Gh is less than a first amount, indicate to change the storage system 10.

Step 220: End.

According to the management process 20, in step 204, the first threshold and the second threshold are determined, and in step 206, the first group G1 is further divided into the hot storage group Gh, the warm storage group Gw and the cold storage group Gc. In an embodiment, the first threshold and the second threshold are related to performance (e.g., input/output operations per second (IOPS), bandwidth rate or latency) of the hard disk. For example, the first threshold is 160 IOPS, the second threshold is 80 IOPS, then the first group G1 is accordingly divided into the hot storage group Gh, the warm storage group Gw and the cold storage group Gc. In addition, the hot storage group Gh, the warm storage group Gw and the cold storage group Gc may respectively correspond to a logic unit number (LUN) or a redundant array of independent disks (RAID), which represents its performance. More specifically, when the IOPS of the hard disk HD is higher than 160, which means that the input/output operations per second of the hard disk is higher than 160 times, i.e. higher than the first threshold, the hard disk HD may be utilized as the hard disk HD that is more often to store or write data; therefore, the hard disk HD may be classified into the hot storage group Gh. Similarly, when the IOPS of the hard disk HD is lower than 80, i.e. lower than the second threshold, which means that the input/output operations per second of the hard disk is lower than 80 times, the hard disk HD may be utilized as the hard disk HD less to store or write data; therefore, the hard disk HD may be classified into the cold storage group Gc.

After an operation period, the storage performance of the storage system 10 is reduced because of the hard disks HD or other external factors. Therefore, in step 208, the storage system 10 examines the performance of each hard disk HD in each of the groups. In step 210, the storage system 10 examines whether performance of any hot storage hard disk in the hot storage group Gh is lower than the first threshold. If yes, the storage system 10 executes step 212, to exchange the hot storage hard disk in the hot storage group Gh, which is lower than the first threshold, with the warm storage hard disk in the warm storage group Gw conforming to the first threshold. If not, the management process 20 proceeds to step 208. Then, in step 214, the storage system 10 examines whether any cold storage hard disk in the cold storage group Gc is higher than the second threshold. If yes, the management process 20 proceeds to step 216, the storage system 10 exchanges the cold storage hard disk in the cold storage group Gc, which is higher than the second threshold, with the warm storage hard disk in the warm storage group Gw, which is lower than the second threshold. If not, the management process 20 proceeds to step 208.

Notably, when exchanging the hot storage hard disk, which does not conform to the first threshold, in the hot storage group Gh with the warm storage hard disk conforming to the first threshold, the controller 104 of the storage system 10 amends a LUN ID or a RAID ID of the exchanged hot storage hard disk and the exchanged warm storage hard disk to change the LUN or RAID of the hard disks individually. In other words, the LUN or RAID of the storage groups remains unchanged when the hard disks exchanges. When the storage system 10 finds out that a hard disk in the storage groups does not conform to the pre-determined condition, the hard disk is exchanged to another storage group, and the original LUN ID or RAID ID of the hard disk is amended to the same as the LUN ID or RAID ID of the another storage group. As a result, the storage system 10 may successfully access data into different storage groups with different types according to the updated LUN ID or RAID ID of the hard disks.

In addition, when the amount of the hard disks included in the hot storage group Gh is less than the first amount, i.e. step 218, the controller 104 indicates to change the storage system 10. For example, if the first amount is one third of a sum of the plurality of hard disks, which represents that the performance of all of the hard disks HD in the storage system 10 are declining. In the meanwhile, the controller 104 or the computer system indicates to a user to change the entire storage system 10 or to replace the entire storage system 10 (i.e. replacing all of the hard disks HD), such that the hard disks HD in each of the storage groups may achieve the required performance. Notably, in the embodiment, the host 102 may further include a spare group GS utilized for transferring data while exchanging the hard disks. Therefore, the storage system 10 of the present disclosure may properly adjust the storage group where the hard disk HD belongs to according to the storage performance of the hard disk HD, so as to access data with different usages and achieve the maximal performance.

In another embodiment, the management process 20 only confirms the first threshold, divides the first group into the hot storage group Gh and the warm storage group Gw according to the first threshold, and exchanges the hot storage hard disk, which is lower than the first threshold, in the hot storage group Gh with the warm storage hard disk, which conforms to the first threshold, in the warm storage group Gw. In the embodiment, the host 102 may further include the spare group GS for transferring data while exchanging the hard disks. In addition, the controller 104 amends the LUN or RAID where the hard disks belong to by amending the LUN ID or RAID ID of the exchanged hot storage hard disk and the exchanged warm storage hard disk.

Figure 3:
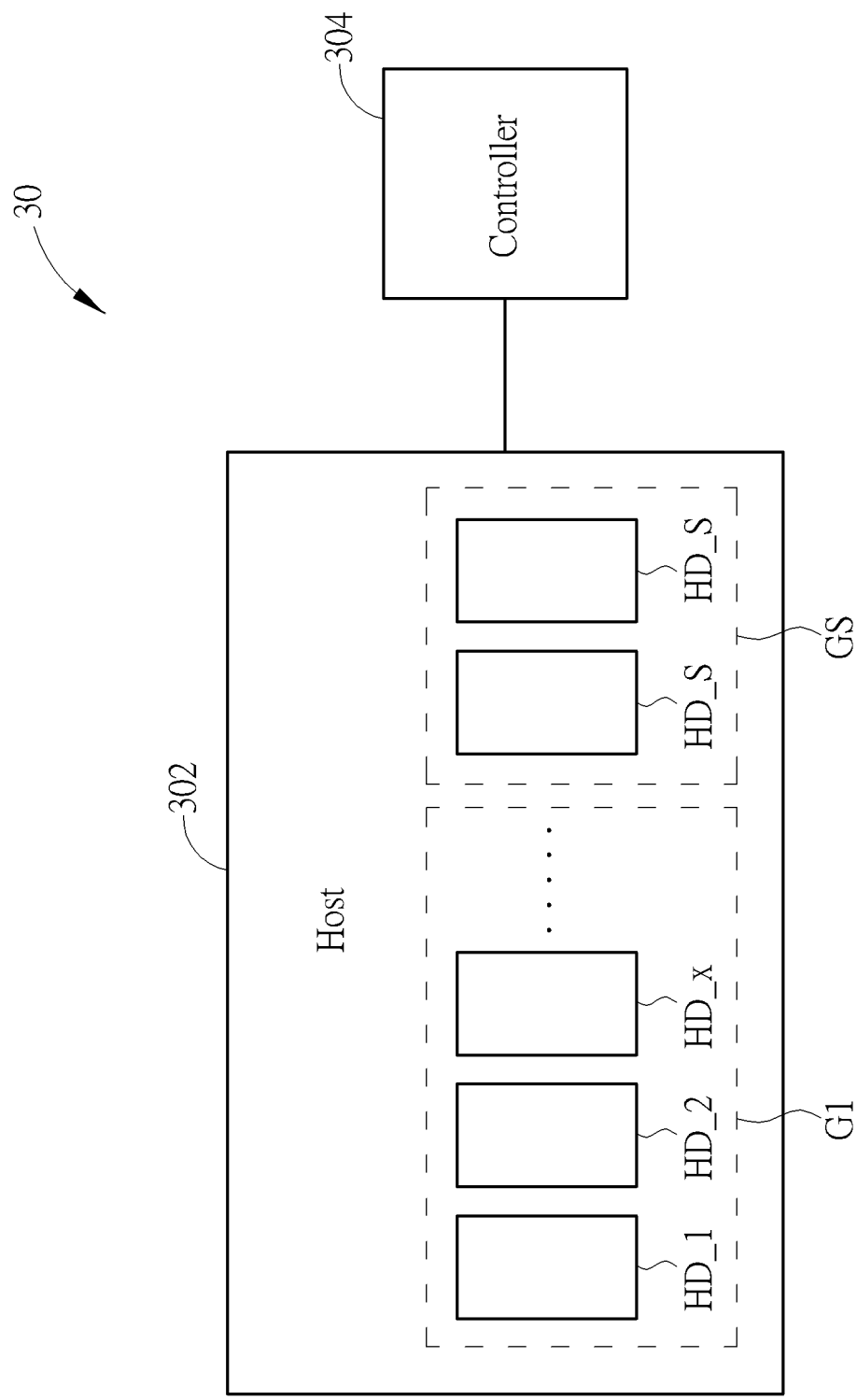
FIG. 3 is a schematic diagram of another storage system according to an embodiment of the present disclosure.

Based on different applications and design concepts, the storage system 10 is implemented in all kinds of methods. Please refer to FIG. 3, which is a schematic diagram of another storage system 30 according to another embodiment of the present disclosure. The storage system 30 includes a host 302 and a controller 304. The controller 304 divides the hard disks HD into a first group G1 and a spare group GS, so as to substitute a spare hard disk HD_S in the spare group GS for a hard disk HD_x in the first group G1 when the hard disk HD_x does not conform to a predetermined condition, and when all of hard disks in the spare group GS are all utilized for substituting the hard disks in the first group G1, the controller 304 indicates to change the storage system 30. Therefore, the storage system 30 of the present disclosure may consistently detect the storage performance of all of the hard disks HD and properly adjust the hard disks HD to store different types of data, so as to maximize the storage performance of the storage system 30.

Figure 4:
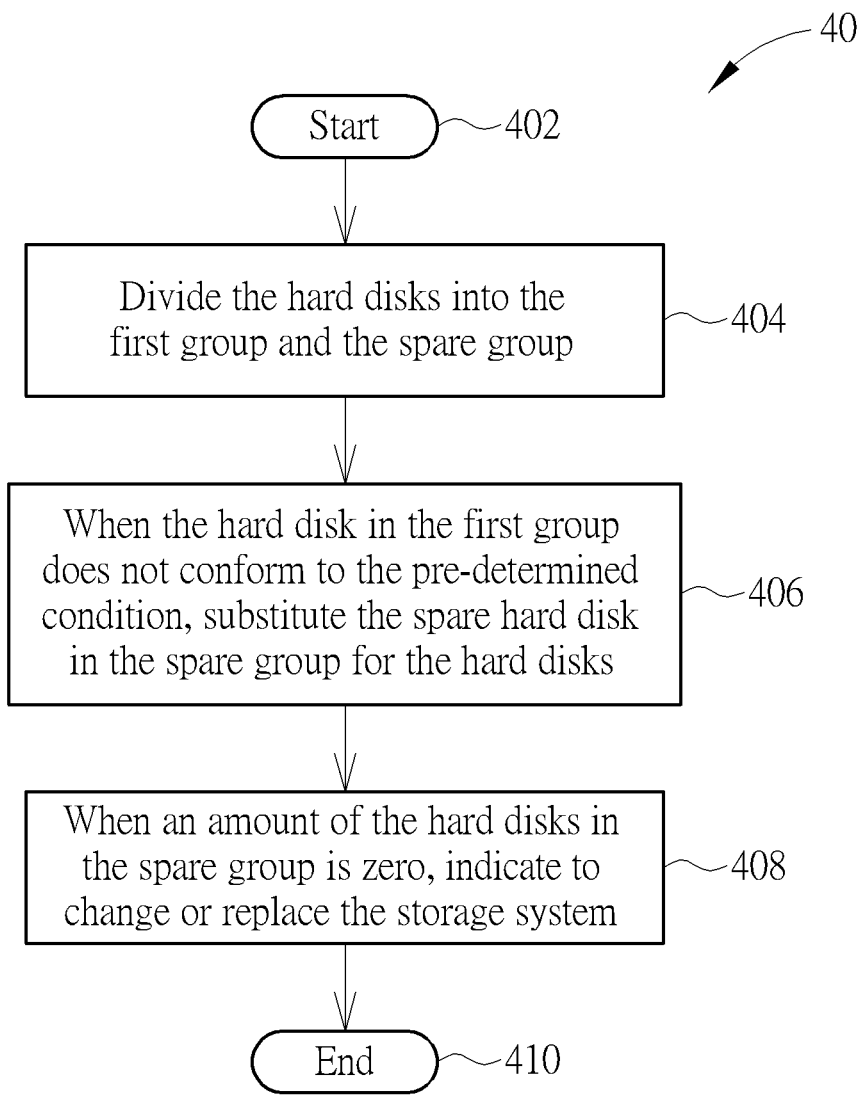
FIG. 4 is a schematic diagram of another management process according to an embodiment of the present disclosure.

Please refer to FIG. 4, which is a schematic diagram of another management process 40 according to an embodiment of the present disclosure. The management process 40 may be compiled as a program code, and executed by the controller 304 of the storage system 30. The management process 40 includes the following steps:

Step 402: Start.

Step 404: Divide the hard disks HD into the first group G1 and the spare group GS.

Step 406: When the hard disk HD_x in the first group G1 does not conform to the pre-determined condition, substitute the spare hard disk HD_S in the spare group GS for the hard disks HD_x.

Step 408: When an amount of the hard disks in the spare group GS is zero, indicate to change or replace the storage system 30.

Step 410: End.

Based on the management process 40, in step 404, the controller 304 classifies all of the hard disks HD into the first group G1 and the spare group GS. In an embodiment, the hard disks HD may be divided into the first group and the spare group GS based on a ratio of a sum of the hard disks HD, so as to perform data access. For example, when there are 15 hard disks HD, one third of the hard disks HD may be classified as the spare group GS, but not limited thereto, and alternatively, a fixed amount or other ratios may be implemented to be taken as the amount of the spare group Gh. In addition, the first group G1 may correspond to a LUN or a RAID to represent a storage performance of the first group G1.

In an initial stage, since the hard disks HD in the storage system 30 are brand new, track errors seldom happen, the storage system 30 operates stably. However, after a time period of operation, a temperature of the storage system 30 increases because of busy operations, and a fan is turned on to perform heat dissipation. Under the circumstance, the turning-on or speedup operations of the fan might increase a vibrating amplitude of the storage system 30, which declines the storage performance of the hard disks HD. Or, when the storage system 30 is busy, the temperature rise causes the hard disk HD, which is at a further distance from the fan, incapable of performing the heat dissipation immediately, and deteriorates the storage performance. Or, when the IOPS of the hard disk HD exceeds a usage limit, the track errors happen, and the storage performance declines.

Therefore, in step 406, when the hard disk HD_x in the first group G1 does not conform to the pre-determined condition, the controller 304 substitutes the spare hard disk HD_S in the spare group GS for the hard disk HD_x. In an embodiment, the pre-determined condition is related to an IOPS of the hard disk HD. For example, when the pre-determined condition of the hard disks HD is 160 IOPS, i.e., IOPS=160 is taken as a threshold, all of the hard disks HD in the storage system 30 are individually examined accordingly. In the situation, when the hard disk HD_x does not conform to the pre-determined condition, i.e. IOPS is less than 160, the hard disk HD_x is classified as a cold storage hard disk and the hard disk HD_x is replaced with the spare hard disk HD_S in the spare hard disk group GS, so as to avoid that single hard disk HD affects the performance of the RAID or LUN of the entire hard disk group. Similarly, when any hard disk in the first group G1 does not conform to the pre-determined condition, the controller 304 substitutes the hard disk for the spare hard disk HD_S in the spare hard disk group GS. Finally, when the amount of the hard disks conforming to the pre-determined condition and included in the spare group GS is zero (i.e. step 408), the controller 304 indicates to change or replace the storage system 30, i.e. all of the hard disks HD. In other words, when all of the spare hard disks HD_S in the spare group GS are utilized for replacing the hard disks in the first group G1, the controller 304 may inform a user, directly or through a computer system, to change the storage system 30. Notably, the controller 304 of the storage system 30 changes the LUN or RAID where the hard disk belongs to by amending a LUN ID or RAID ID of the hard disk when the hard disk does not conform to the pre-determined condition. As a result, a storage function of the replaced hard disk HD_x is changed and the spare hard disk HD_S in the spare group GS is utilized for executing the storage function originally executed by the replaced hard disks HD_x. Therefore, according to the management process 40, the storage system 30 may substitute the spare hard disk HD_S having better performance in the spare group GS for the hard disks HD_x having inferior performance in the first group G1, so as to optimize the performance of the storage system 30.

Notably, the embodiments stated above are to illustrate the concept of the present disclosure, those skilled in the art may make proper modifications to the present disclosure accordingly, and not limited thereto. Based on different applications and design concepts, the storage system and the management method may be implemented in all kinds of method. For example, the pre-determined condition utilized for dividing the hard disks into different types of storage groups or the amount and quantity of the threshold of the pre-determined condition may be modified according to system settings or user requirements, and not limited thereto, which all belong to the scope of the present disclosure.

In summary, the present disclosure provides the storage system and the management method thereof, which properly adjusts the storage devices to store data with different usages according to the storage performance of the storage devices, so as to maximize the efficiency of the storage system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A management method for a storage system, wherein the storage system comprises a plurality of hard disks, the management method comprising:
    dividing the plurality of hard disks into a hot storage group, a warm storage group and a cold storage group according to a first threshold and a second threshold;
    exchanging a first warm storage hard disk conforming to the first threshold in the warm storage group with a hot storage hard disk in the hot storage group in response to not conform to the first threshold; and
    exchanging a cold storage hard disk conforming to the second threshold in the cold storage group with a second warm storage hard disk in the warm storage group in response to not conform to the second threshold;
    wherein when an amount of hard disks included in the hot storage group is less than a first amount, the storage system is indicated to be changed.

2. The management method of claim 1, wherein the hot storage group, the warm storage group and the cold storage group respectively correspond to a logic unit number (LUN) or a redundant array of independent disks (RAID).

3. The management method of claim 1, wherein the first threshold and the second threshold are related to an input/output operations per second (IOPS) of the plurality of hard disks.

4. The management method of claim 1, wherein the first amount is one third of a sum of the plurality of hard disks.

5. A storage system, comprising:
    a host, comprising a plurality of hard disks; and
    a controller coupled to the host, for executing a management process, wherein the management process comprises:
        dividing the plurality of hard disks into a hot storage group, a warm storage group and a cold storage group according to a first threshold and a second threshold;
        exchanging a first warm storage hard disk conforming to the first threshold in the warm storage group with a hot storage hard disk in the hot storage group in response to not conform to the first threshold; and
        exchanging a cold storage hard disk conforming to the second threshold in the cold storage group with a second warm storage hard disk in the warm storage group in response to not conform to the second threshold;
        wherein when an amount of hard disks included in the hot storage group is less than a first amount, the storage system is indicated to be changed.

6. The storage system of claim 5, wherein the hot storage group, the warm storage group and the cold storage group respectively correspond to a LUN or a RAID.

7. The storage system of claim 5, wherein the first threshold and the second threshold are related to an input/output operations per second (IOPS) of the plurality of hard disks.

8. The storage system of claim 5, wherein the first amount is one third of a sum of the plurality of hard disks.

* * * * *